(12) United States Patent
Suzuki et al.

(10) Patent No.: US 10,131,203 B2
(45) Date of Patent: Nov. 20, 2018

(54) REFRIGERATION CYCLE DEVICE

(71) Applicant: DENSO CORPORATION, Kariya, Aichi-pref. (JP)

(72) Inventors: Tatsuhiro Suzuki, Kariya (JP); Gouta Ogata, Kariya (JP); Yuichi Shirota, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 196 days.

(21) Appl. No.: 15/027,120

(22) PCT Filed: Sep. 22, 2014

(86) PCT No.: PCT/JP2014/004845
§ 371 (c)(1),
(2) Date: Apr. 4, 2016

(87) PCT Pub. No.: WO2015/052881
PCT Pub. Date: Apr. 16, 2015

(65) Prior Publication Data
US 2016/0280041 A1    Sep. 29, 2016

(30) Foreign Application Priority Data
Oct. 8, 2013    (JP) .................. 2013-211076

(51) Int. Cl.
*F25B 1/06* (2006.01)
*B60H 1/00* (2006.01)
(Continued)

(52) U.S. Cl.
CPC ....... *B60H 1/00921* (2013.01); *B60H 1/0075* (2013.01); *B60H 1/00392* (2013.01);
(Continued)

(58) Field of Classification Search
CPC .............. B60H 1/00921; B60H 1/0075; B60H 1/00392; F25B 43/006; F25B 41/062
See application file for complete search history.

(56) References Cited

U.S. PATENT DOCUMENTS 2,513,361 A   7/1950   Rausch
2,887,857 A   5/1959   Scullen
(Continued)

FOREIGN PATENT DOCUMENTS

CN    102734989 A    10/2012
GB       660771 A    11/1951
(Continued)

OTHER PUBLICATIONS

Inaba et al., Vapor Compression Type Refrigerator, Sep. 16, 2004, JP2004257694A, Whole Pages.*

(Continued)

*Primary Examiner* — Larry Furdge
(74) *Attorney, Agent, or Firm* — Harness, Dickey & Pierce, P.L.C.

(57) ABSTRACT

An ejector draws a refrigerant on a downstream side of an exterior heat exchanger serving as an evaporator, from a refrigerant suction port by a suction effect of an injection refrigerant injected from a nozzle portion for decompressing a part of the refrigerant discharged from a compressor, and mixes the injection refrigerant with the suction refrigerant to pressurize the mixed refrigerant at a diffuser. The refrigerant flowing out of the diffuser is drawn into the compressor. In this way, the density of the refrigerant drawn into the compressor can be increased, thereby suppressing reduction in flow amount of the refrigerant flowing into an interior condenser serving as a radiator. Thus, even if the temperature of the outside air (heat-absorption target fluid) is decreased, the interior condenser is prevented from degrad- (Continued)

ing its heating capacity for the ventilation air (heating target fluid).

6 Claims, 6 Drawing Sheets

(51) Int. Cl.
    *F25B 1/10* (2006.01)
    *F25B 5/04* (2006.01)
    *F25B 41/04* (2006.01)
    *F25B 41/06* (2006.01)
    *F25B 43/00* (2006.01)
    *B60H 1/32* (2006.01)

(52) U.S. Cl.
    CPC .......... *F25B 1/06* (2013.01); *F25B 1/10* (2013.01); *F25B 5/04* (2013.01); *F25B 41/04* (2013.01); *F25B 41/062* (2013.01); *F25B 43/006* (2013.01); *B60H 2001/3298* (2013.01); *F25B 2341/0012* (2013.01); *F25B 2400/0409* (2013.01); *F25B 2400/0411* (2013.01); *F25B 2500/31* (2013.01); *F25B 2600/112* (2013.01); *F25B 2600/2501* (2013.01); *F25B 2600/2513* (2013.01); *F25B 2600/2515* (2013.01); *F25B 2600/2519* (2013.01); *F25B 2700/1931* (2013.01); *F25B 2700/2103* (2013.01); *F25B 2700/2104* (2013.01); *F25B 2700/2106* (2013.01); *F25B 2700/2117* (2013.01); *F25B 2700/21152* (2013.01)

(56) References Cited

U.S. PATENT DOCUMENTS

| | | | |
|---|---|---|---|
| 5,704,219 | A | 1/1998 | Suzuki et al. |
| 6,698,221 | B1 | 3/2004 | You |
| 2011/0005268 | A1* | 1/2011 | Oshitani ............ F25B 41/00 62/500 |
| 2012/0255319 | A1 | 10/2012 | Itoh et al. |
| 2014/0345318 | A1 | 11/2014 | Nagano et al. |
| 2015/0159933 | A1 | 6/2015 | Itoh et al. |

FOREIGN PATENT DOCUMENTS

| | | | |
|---|---|---|---|
| JP | S59225259 A | | 12/1984 |
| JP | H0939550 A | | 2/1997 |
| JP | 2004257694 A | * | 9/2004 |
| JP | 2008190769 A | | 8/2008 |
| JP | 2009264633 A | | 11/2009 |
| JP | 2012117760 A | | 6/2012 |
| JP | 2013002710 A | | 1/2013 |
| JP | 2013108632 A | | 6/2013 |
| JP | 2014206362 A | | 10/2014 |

OTHER PUBLICATIONS

International Search Report and Written Opinion (in Japanese with English Translation) for PCT/JP2014/004845, dated Dec. 16, 2014; ISA/JP.

* cited by examiner

STRONG-AIR-HEATING OPERATION MODE

REFRIGERATION CYCLE DEVICE

CROSS REFERENCE TO RELATED APPLICATIONS

This application is a U.S. National Phase Application under 35 U.S.C. 371 of International Application No. PCT/JP2014/004845 filed on Sep. 22, 2014 and published in Japanese as WO 2015/052881 A1 on Apr. 16, 2015. This application is based on and claims the benefit of priority from Japanese Patent Application No. 2013-211076 filed on Oct. 8, 2013. The entire disclosures of all of the above applications are incorporated herein by reference.

FIELD OF THE INVENTION

The present invention relates to a refrigeration cycle device including an ejector.

BACKGROUND ART

In the related art, for example, Patent Document 1 discloses a refrigeration cycle device to be applied to an air conditioner. The refrigeration cycle device is designed to heat ventilation air (i.e., heating target fluid) that is to be blown into a space to be air-conditioned in an air-heating operation mode, which performs air-heating of the space to be air-conditioned.

More specifically, the refrigeration cycle device described in Patent Document 1 includes an interior condenser (i.e., radiator) that heats the ventilation air by exchanging heat between the ventilation air and a high-pressure refrigerant discharged from a compressor. The refrigeration cycle device also includes an exterior heat exchanger (e.g., evaporator) that evaporates a low-pressure refrigerant by exchanging heat between the low-pressure refrigerant and the outside air (heat-absorption target fluid). In the air-heating operation, heat absorbed by the refrigerant from the outside air in the exterior heat exchanger is dissipated into the ventilation air at the interior condenser, thereby heating the ventilation air.

PRIOR ART LIST

Patent Document

Patent Document 1: Japanese Unexamined Patent Application Publication No. 2013-002710

SUMMARY OF THE INVENTION

According to studies by the inventors of the present application, the refrigerant evaporation temperature in an exterior heat exchanger needs to be set lower than the outside air temperature during the air-heating operation in a system that is designed to heat a ventilation air using heat absorbed from outside air as a heat source in the air-heating operation, like the refrigeration cycle device disclosed in Patent Document 1. Thus, for example, when the outside air temperature is low, the refrigerant evaporation temperature in the exterior heat exchanger must be reduced to an ultralow temperature (e.g., $-10°$ C. or less).

However, when the refrigerant evaporation temperature in the exterior heat exchanger is reduced to the ultralow temperature, the suction refrigerant flowing out of the exterior heat exchanger that is to be drawn into a compressor decreases its pressure, which reduces the density of the suction refrigerant. As a result, the flow amount (mass flow amount) of a high-pressure refrigerant discharged from the compressor to flow into an interior condenser might be decreased, thus reducing the heating capacity of the interior condenser for the ventilation air.

The present invention has been made in view of the foregoing matter, and it is an object of the present invention to provide a refrigeration cycle device that can prevent the degradation of the heating capacity of a radiator for a heating target fluid when the temperature of the heat-absorption target fluid is decreased.

The present disclosure has been made to achieve the foregoing object, and a refrigerant cycle device according to an aspect of the present disclosure includes a compressor that compresses and discharges a refrigerant, a radiator that exchanges heat between a heating target fluid and a high-pressure refrigerant discharged from the compressor dissipate heat from the high-pressure refrigerant, a decompression device that decompresses the refrigerant flowing out of the radiator, an evaporator that exchanges heat between a heat-absorption target fluid and a low-pressure refrigerant decompressed by the decompression device to evaporate the low-pressure refrigerant, and an ejector. The ejector draws a refrigerant on a downstream side of the evaporator from a refrigerant suction port by a suction effect of an injection refrigerant injected at a high velocity from a nozzle portion decompressing the high-pressure refrigerant discharged from the compressor, and the ejector includes a pressurizing portion that mixes the injection refrigerant with the suction refrigerant drawn from the refrigerant suction port, pressurizes the mixed refrigerant, and allows the pressurized mixed refrigerant to flow out toward a suction port side of the compressor.

Thus, the ejector is provided for drawing and pressurizing the refrigerant on the downstream side of the evaporator, so that the pressure of the suction refrigerant drawn into the compressor can be raised to a higher level than the refrigerant evaporation pressure at the evaporator, thereby increasing the density of the suction refrigerant.

Accordingly, the refrigeration cycle device can suppress the reduction in flow amount (mass flow amount) of the high-pressure refrigerant discharged from the compressor to flow into the radiator, even under the operation conditions in which the refrigerant evaporation temperature at the evaporator must be decreased because of the low temperature of the heat-absorption target fluid. As a result, even if the temperature of the heat-absorption target fluid is decreased, the heating capacity of the heating target fluid in the radiator can be prevented from being degraded.

Note that the heating capacity of the radiator for the heating target fluid is a capacity of heating the heating target fluid to a desired temperature at a desired flow amount by the radiator. Specifically, the heating capacity can be defined using a value obtained by multiplying a difference in enthalpy by the flow amount (mass flow amount) of the refrigerant circulating through the radiator, in which the difference in enthalpy is determined by subtracting an enthalpy of the refrigerant on the outlet side of the radiator from that of the refrigerant on the inlet side thereof.

DETAILED DESCRIPTION OF THE PREFERRED EMBODIMENTS

First Embodiment

A first embodiment of the present invention will be described below with reference to FIGS. 1 to 4. In this embodiment, a vapor-compression refrigeration cycle device 10 according to the present invention is applied to a vehicle air conditioner 1 for an electric vehicle that is designed to obtain a driving force for traveling from a traveling electric motor. The refrigeration cycle device 10 serves to cool or heat ventilation air that is to be blown into the vehicle interior as a space to be air-conditioned in the vehicle air conditioner 1. Thus, a fluid to be heated, or a heating target fluid in this embodiment is ventilation air to be blown into the vehicle interior.

The refrigeration cycle device 10 is configured to enable switching among a refrigerant circuit for an air-cooling operation mode of cooling the vehicle interior; a refrigerant circuit for a dehumidification heating operation mode of air-heating during dehumidifying the vehicle interior; a refrigerant circuit for an air-heating operation mode of heating the vehicle interior; and a refrigerant circuit for a strong-air-heating operation mode of heating ventilation air with a higher heating capacity than that in the air-heating operation mode, for example, when the outside air temperature is low.

Figure 1:
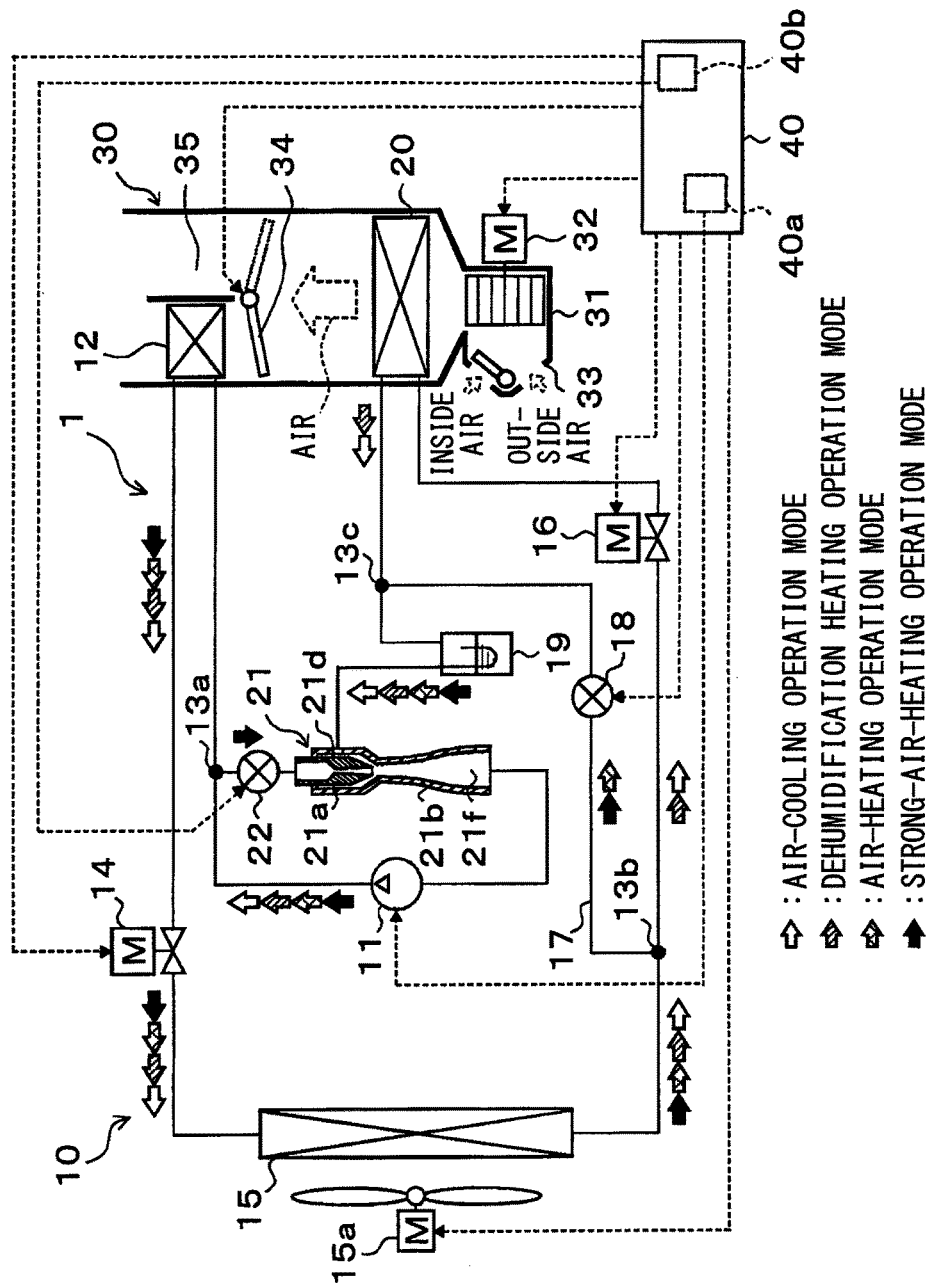
FIG. 1 is an entire configuration diagram of a refrigeration cycle device according to a first embodiment.

Note that in FIG. 1, the flow of a refrigerant in the refrigerant circuit for the air-cooling operation mode is indicated by outlined arrows; the flow of a refrigerant in the refrigerant circuit for the dehumidification heating operation mode is indicated by diagonal hatched arrows; the flow of a refrigerant in the refrigerant circuit for the air-heating operation mode is indicated by shaded-hatched arrows; and the flow of a refrigerant in the refrigerant circuit for the strong-air-heating operation mode is indicated by black arrows.

The refrigeration cycle device 10 in this embodiment employs a hydrofluorocarbon (HFC) refrigerant (e.g., R134a) as the refrigerant, and forms a vapor-compression subcritical refrigeration cycle in which a high-pressure side refrigerant pressure thereof does not exceed the critical pressure of the refrigerant. Obviously, a hydrofluoro-olefin (HFO) refrigerant (for example, R1234yf) or the like may be used as the refrigerant. Refrigerating machine oil for lubricating a compressor 11 is mixed into the refrigerant, and a part of the refrigerating machine oil circulates through the cycle together with the refrigerant.

The compressor 11 is disposed in a vehicle bonnet and draws the refrigerant thereinto, pressurizes the drawn refrigerant to a high-pressure refrigerant, and then discharges the pressurized refrigerant therefrom in the refrigeration cycle device 10. Specifically, the compressor 11 of this embodiment is an electric compressor that accommodates, in one housing, a fixed displacement compression mechanism and an electric motor for driving the compression mechanism.

Various types of compression mechanisms, including a scroll compression mechanism and a vane compression mechanism, can be employed as the compression mechanism. The electric motor has its operation (the number of revolutions) controlled by a control signal output from an air conditioning controller 40 to be described later. The electric motor may employ either an AC motor or a DC motor.

A discharge port side of the compressor 11 is coupled to a refrigerant inflow port of a first branch portion 13a that branches the flow of refrigerant discharged from the compressor 11. The first branch portion 13a is formed of a three-way joint having three inflow and outflow ports, one of which is a refrigerant inflow port, and the remaining two of which are refrigerant outflow ports. Such a three-way joint may be formed by jointing pipes with different diameters, or by forming a plurality of refrigerant passages in a metal or resin block.

One refrigerant outflow port of the first branch portion 13a is coupled to the refrigerant inlet side of an interior condenser 12. Further, the other refrigerant outflow port of the first branch portion 13a is coupled to the inlet side of a nozzle portion 21a of an ejector 21 via a nozzle on-off valve 22. Note that the detailed structure of the nozzle on-off valve 22 and the ejector 21 will be described later.

The indoor condenser 12 is disposed in a casing 31 of an interior air conditioning unit 30 to be described later. The indoor condenser 12 is a radiator that exchanges heat between the high-pressure refrigerant discharged from the compressor 11 and the ventilation air having passed through an interior evaporator 20 to be described later, thereby dissipating heat from the high-pressure refrigerant.

The refrigerant outlet side of the interior condenser 12 is coupled to the inlet side of a heating expansion valve 14. The heating expansion valve 14 is a decompression device that decompresses the high-pressure refrigerant discharged from the compressor 11 in at least the air-heating operation mode. Specifically, the heating expansion valve 14 is an electric variable throttle mechanism that includes a valve body capable of changing the throttle opening degree and an electric actuator configured of a stepping motor for changing the throttle opening degree by displacing the valve body.

The heating expansion valve 14 of this embodiment is configured of a variable throttle mechanism with a fully opening function that serves as a single refrigerant passage by fully opening its throttle opening degree without almost exhibiting any refrigerant decompressing effect. The heating expansion valve 14 has its operation controlled by a control signal output from the air conditioning controller 40.

The outlet side of the heating expansion valve 14 is coupled to the refrigerant inlet side of an exterior heat exchanger 15. The exterior heat exchanger 15 is disposed at the front side in the vehicle bonnet, and adapted to exchange heat between the refrigerant flowing therethrough on the downstream side of the interior condenser 12 and the outside air blown from a blower fan 15a.

More specifically, in at least the air-cooling operation mode, the exterior heat exchanger 15 serves as a radiator that dissipates heat from the high-pressure refrigerant. On the other hand, in the air-heating operation mode as well as the strong-air-heating operation mode, the exterior heat exchanger 15 serves as an evaporator that exhibits a heat absorption effect by evaporating the low-pressure refrigerant decompressed by the heating expansion valve 14 as the decompression device. The blower fan 15a is an electric blower that has its operating ratio, that is, the number of revolutions thereof (volume of ventilation air) controlled by a control voltage output from the air conditioning controller 40.

The refrigerant outlet side of the exterior heat exchanger 15 is coupled to a refrigerant inflow port of a second branch portion 13b that branches the flow of refrigerant discharged from the exterior heat exchanger 15. The second branch portion 13b has the substantially same basic structure as that of the first branch portion 13a. One refrigerant outflow port of the second branch portion 13b is coupled to the refrigerant inlet side of a cooling expansion valve 16. The other refrigerant outflow port of the second branch portion 13b is coupled to an accumulator-side passage 17 that guides the refrigerant flowing out of the second branch portion 13b to the upstream side of an accumulator 19 to be described later.

The cooling expansion valve 16 has the substantially same basic structure as that of the heating expansion valve 14. The cooling expansion valve 16 in this embodiment is configured of a variable throttle mechanism with not only a fully opening function but also a completely closing function. Specifically, the cooling expansion valve 16 fully opens a refrigerant passage leading from the refrigerant outlet side of the exterior heat exchanger 15 to the refrigerant inlet side of the interior evaporator 20 when fully opening its throttle opening. Further, the cooling expansion valve 16 closes the refrigerant passage when completely closing the throttle opening degree.

The outlet side of the cooling expansion valve 16 is coupled to the refrigerant inlet side of the interior evaporator 20. The interior evaporator 20 is disposed upstream of the ventilation air flow rather than the interior condenser 12, in the casing 31 of the indoor air conditioning unit 30. Further, the interior evaporator 20 is a cooling heat exchanger that exchanges heat between the refrigerant circulating therethrough and the ventilation air before passing through the interior condenser 12 to evaporate the refrigerant, thereby cooling the ventilation air in the air-cooling operation mode as well as the dehumidification heating operation mode.

The refrigerant outlet side of the interior evaporator 20 is coupled to the inlet side of the accumulator 19 via a merging portion 13c. The accumulator 19 is a gas-liquid separator that separates the refrigerant flowing thereinto, into liquid and gas phases, and which stores therein the excessive refrigerant within the cycle. The merging portion 13c is formed of the same type of three-way joint as the first and second branch portions 13a and 13b. The three-way joint has three inflow and outflow ports, two of which are refrigerant inflow ports, and the remaining one of which is a refrigerant outflow port.

The other refrigerant inflow port of the merging portion 13c in this embodiment is coupled to the outlet side of the above-mentioned accumulator-side passage 17. A heating on-off valve 18 is disposed in the accumulator-side passage 17 to open and close the accumulator-side passage 17. The heating on-off valve 18 is an electromagnetic valve that has the opening and closing operations thereof controlled by a control voltage output from the air conditioning controller 40.

A gas-phase refrigerant outlet of the accumulator 19 is coupled to a side of a refrigerant suction port 21d of the ejector 21. The ejector 21 decompresses the high-pressure refrigerant flowing out of the other refrigerant outflow port of the first branch portion 13a to inject the decompressed refrigerant at high velocity. In this way, the ejector 21 serves to draw, from the refrigerant suction port 21d, the gas-phase refrigerant flowing out of the accumulator 19, thereby converting the kinetic energy of a mixed refrigerant including the injection refrigerant and the sucked refrigerant into the pressure energy thereof.

Figure 2:
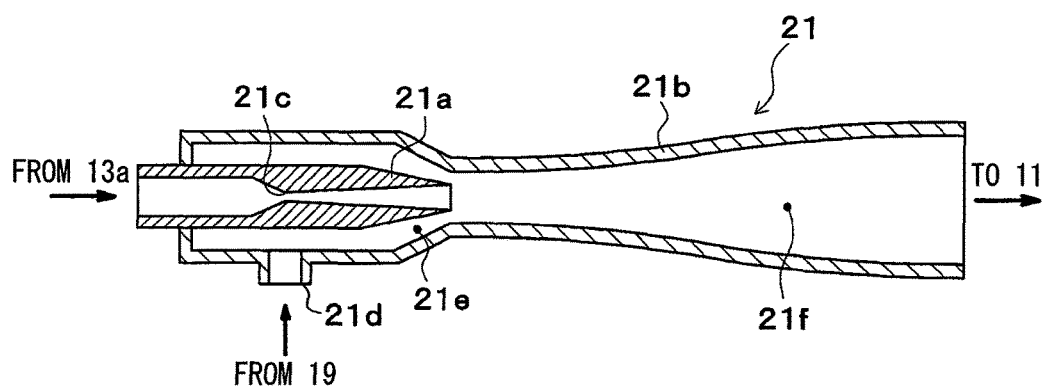
FIG. 2 is a cross-sectional view of an ejector in an axial direction thereof in the first embodiment.

The detailed structure of the ejector 21 will be described below using FIG. 2. As shown in FIG. 2, the ejector 21 includes the nozzle portion 21a and a body portion 21b. The nozzle portion 21a is formed of metal (e.g., a stainless alloy) having a substantially cylindrical shape that gradually tapered toward the flow direction of the refrigerant. The nozzle portion 21a isentropically decompresses the refrigerant flowing thereinto to inject the decompressed refrigerant from the refrigerant injection port provided on the most downstream side of the refrigerant flow.

The refrigerant passage formed in the nozzle portion 21a has a throat portion (portion with the minimum passage area) 21c having the minimum refrigerant passage area, a tapered portion having the refrigerant passage area thereof gradually decreased from the refrigerant inflow port side toward the throat portion 21c, and a spreading portion having the refrigerant passage area thereof gradually enlarged from the throat portion 21c toward a refrigerant injection port. That is, the nozzle portion 21a of this embodiment is configured as a rubber nozzle. It is apparent that the nozzle portion 21a may be formed of a tapered nozzle.

This embodiment employs the nozzle portion 21a that is designed to set the flow speed of the injection refrigerant injected from the refrigerant injection port to a sound speed or higher in the strong-air-heating operation mode to be described later.

In this embodiment, the decompression characteristics (flow amount characteristics) of the nozzle portion 21a are set to satisfy the following formula F1.

$$0.3 \leq Gn/Gr \leq 0.5 \tag{F1}$$

wherein Gr is a discharge refrigerant flow amount that is a flow amount of the refrigerant discharged from the compressor 11; Gn is an ejector-side refrigerant flow amount that is a flow amount of the refrigerant flowing into the nozzle portion 21a of the ejector 21; and Gc is a radiator-side refrigerant flow amount that is a flow amount of the refrigerant flowing into the interior condenser 12.

Note that any of the discharge refrigerant flow amount Gr, the ejector-side refrigerant flow amount Gn, and the radiator-side refrigerant flow amount Gc is a mass flow amount, and the discharge refrigerant flow amount Gr is the total of the ejector-side refrigerant flow amount Gn and the radiator-side refrigerant flow amount Gc.

The body portion 21b is formed of metal (e.g., aluminum) in a substantially cylindrical shape. The body portion 21b serves as a fixing member that supports and fixes the nozzle portion 21a therein to form an outer envelope of the ejector 21. More specifically, the nozzle portion 21a is fixed by being pressed into the body portion 21b to be accommodated inside the body portion 21b on one end side in the longitudinal direction of the body portion 21b. Thus, the refrigerant does not leak from a fixed portion (pressed portion) between the nozzle portion 21a and the body portion 21b.

The refrigerant suction port 21d is formed to entirely penetrate a part on the outer peripheral surface of the body portion 21b corresponding to the outer peripheral side of the nozzle portion 21a to thereby communicate with the refrigerant injection portion of the nozzle portion 21a. The refrigerant suction port 21d is a through hole that draws, into the ejector 21, the refrigerant flowing out of the gas-phase refrigerant outlet of the accumulator 19 by a suction effect of the refrigerant injected from the nozzle portion 21a.

The inside of the body portion 21b is provided with a suction passage 21e for guiding the suction refrigerant sucked from the refrigerant suction port 21d to the refrigerant injection port side of the nozzle portion 21a, as well as a diffuser 21f serving as a booster for mixing the injection refrigerant with the suction refrigerant flowing from the refrigerant suction port 21d into the ejector 21 via the suction passage 21e to increase the pressure of the mixture.

The suction passage 21e is formed by a space between the outer peripheral side of the tapered tip periphery of the nozzle portion 21a and the inner peripheral side of the body portion 21b. The refrigerant passage area of the suction passage 21e is gradually decreased toward the refrigerant flow direction. Thus, the flow speed of the suction refrigerant circulating through the suction passage 21e is gradually increased, which decreases the energy loss (mixing loss) when mixing the suction refrigerant with the injection refrigerant by the diffuser 21f.

The diffuser 21f is disposed to continuously lead to an outlet of the suction passage and formed by a space in such a manner as to gradually increase its refrigerant passage area. Thus, the diffuser 21f has a function of mixing the injection refrigerant and the suction refrigerant to decelerate the flow velocity of the mixed refrigerant, thereby increasing the pressure of the mixed refrigerant of the injection refrigerant and the suction refrigerant, that is, a function of converting the kinetic energy of the mixed refrigerant into the pressure energy thereof.

More specifically, the cross-sectional shape of the section in the axial direction of the inner peripheral wall surface of the body portion 21b forming the diffuser 21f in this embodiment is formed by combination of a plurality of curved lines. The expanding degree of the refrigerant passage sectional area of the diffuser 21f is gradually increased and then decreased again toward the refrigerant flow direction, which can isentropically pressurize the refrigerant.

The refrigerant outlet of the diffuser 21f in the ejector 21 is coupled to the suction port side of the compressor 11. The refrigerant passage for connecting the other refrigerant outflow port of the first branch portion 13a to the refrigerant inflow port of the nozzle portion 21a in the ejector 21 is provided with the nozzle on-off valve 22 that serves as an opening-closing component for opening and closing the refrigerant passage.

The nozzle on-off valve 22 is configured of an electromagnetic valve of a non-energization closed type (of the so-called normal closed type). The nozzle on-off valve 22 has its operation controlled by a control voltage output from the air conditioning controller 40.

The air conditioning controller 40 opens the nozzle on-off valve 22, thereby switching to a pressurization refrigerant circuit that allows the refrigerant discharged from the compressor 11 to flow into the nozzle portion 21a and causes the diffuser 21f to pressurize a mixed refrigerant of the injection refrigerant and the suction refrigerant. On the other hand, the air conditioning controller 40 closes the nozzle on-off valve 22, thereby switching to a non-pressurization refrigerant circuit that does not cause the diffuser 21f to pressurize the mixed refrigerant.

For example, the nozzle on-off valve 22 of this embodiment is one example of the refrigerant circuit switch.

Next, the interior air conditioning unit 30 will be described below. The interior air conditioning unit 30 serves to blow, into the vehicle compartment, the ventilation air having its temperature adjusted by the refrigeration cycle device 10. The interior air conditioning unit 30 is disposed inside the dashboard (instrument panel) at the foremost part of the vehicle compartment. The interior air conditioning unit 30 accommodates a blower 32, the interior evaporator 20, the interior condenser 12, and the like in the casing 31 forming an outer envelope.

The casing 31 forms an air passage for ventilation air to be blown into the vehicle interior. The casing 31 is formed of resin (for example, polypropylene) with some elasticity and excellent strength. On the most upstream side of the ventilation air flow in the casing 31, an inside/outside air switch 33 is provided to serve as inside/outside air switching portion for switching between the inside air (air in the vehicle compartment) and the outside air (air outside the vehicle compartment) to introduce the switched air into the casing 31.

The inside/outside air switch 33 continuously adjusts opening areas of an inside air inlet for introducing the inside air into the casing 31 and an outside air inlet for introducing the outside air into the casing 31 by use of an inside/outside air switching door, thereby continuously changing a ratio of the volume of the inside air to the outside air. The inside/outside air switching door is driven by an electric actuator for the inside/outside air switching door. The electric actuator has its operation controlled by a control signal output from the air conditioning controller 40.

On the downstream side of ventilation air flow in the inside/outside air switch 33, the blowing fan (blower) 32 is provided for blowing air drawn via the inside/outside air switch 33 toward the vehicle interior. The blower 32 is an electric blower that drives a centrifugal multi-blade fan (sirrocco fan) by an electric motor. The blower 32 has its number of revolutions (volume of ventilation air) controlled by a control voltage output from the air conditioning controller 40.

The interior evaporator 20 and the interior condenser 12 are disposed on the downstream side of the ventilation air flow from the blower 32 in this order with respect to the flow of the ventilation air. A cool air bypass passage 35 is formed to allow the ventilation air having passed through the interior evaporator 20 to flow downstream while bypassing the interior condenser 12 in the casing 31.

An air mix door 34 is disposed on the downstream side of the ventilation air flow in the interior evaporator 20 and on the upstream side of the ventilation air flow in the interior condenser 12. The air mix door 34 adjusts the rate of the volume of the air passing through the interior condenser 12 among the ventilation air having passed through the interior evaporator 20.

On the downstream side of the ventilation air flow of the interior condenser 12, a mixing space is provided to mix the ventilation air heated by the interior condenser 12 and the ventilation air passing through the cool air bypass passage 35 and not heated by the interior condenser 12. Openings for blowing the ventilation air (conditioned air) mixed in the mixing space into the vehicle interior as a space to be air-conditioned are provided on the most downstream side of the ventilation air flow in the casing 31.

Specifically, the openings include a face opening for blowing the conditioned air toward the upper body of a passenger in the vehicle compartment, a foot opening for blowing the conditioned air toward the feet of the passenger, and a defroster opening for blowing the conditioned air toward the inner side surface of a windshield of the vehicle (all the openings not being shown). A face air outlet, a foot air outlet, and a defroster air outlet (not shown) provided in the vehicle interior are connected to the downstream sides of the ventilation air flows from these face opening, foot opening, and defroster opening via respective ducts forming the air passages.

Thus, the air mix door 34 adjusts the ratio of volume of air passing through the interior condenser 12 to that of air passing through the cool air bypass passage 35 to thereby adjust the temperature of the conditioned air mixed in the mixing space, thus controlling the temperature of the ventilation air (conditioned air) blown from each air outlet into the vehicle interior.

That is, the air mix door 34 serves as a temperature adjustment unit adapted to adjust the temperature of the conditioned air to be blown into the vehicle interior. The air mix door 34 is driven by an electric actuator for driving the air mix door. The electric actuator has its operation controlled by a control signal output from the air conditioning controller 40.

A face door for adjusting an opening area of the face opening is positioned on the upstream side of the ventilation air flow of the face opening; a foot door for adjusting an opening area of the foot opening is positioned on the upstream side of the ventilation air flow of the foot opening; and a defroster door for adjusting an opening area of the defroster opening is positioned on the upstream side of the ventilation air flow of the defroster opening (these doors being not shown).

These face door, foot door, and defroster door configure an opening mode switch for switching among opening modes. These doors are coupled in cooperation with and rotated with the electric actuator for driving the air outlet mode door via a link mechanism and the like. Note that the electric actuator has its operation controlled by a control signal output from the air conditioning controller 40.

The air outlet modes switched by the air outlet mode switch specifically include a face mode of blowing air from the face air outlet toward the upper body of a passenger in the vehicle interior by fully opening the face air outlet; and a bi-level mode of blowing the air toward the upper body and the feet of the passenger in the vehicle interior by opening both the face air outlet and foot air outlet. The air outlet modes also include a foot mode of blowing air mainly from the foot air outlet by fully opening the foot air outlet while opening the defroster air outlet only by a small opening degree; and a foot defroster mode of blowing air from both the foot air outlet and the defroster air outlet by opening the foot air outlet and the defroster air outlet to the same degree.

Further, an air outlet mode selector switch provided in an operation panel is manually operated by the passenger, so that the defroster air outlet is fully opened to enable setting of a defroster mode of blowing air from the defroster air outlet toward the inner face of the windshield of the vehicle.

Next, an electric controller of this embodiment will be described below. The air conditioning controller 40 is configured of a well-known microcomputer, including a CPU, a ROM, a RAM, and the like, and its peripheral circuit. The air conditioning controller 40 performs various computations and processing based on air-conditioning control programs stored in the ROM and controls the operations of various devices 11, 14, 15a, 16, 18, 22, 32, 34, and the like to be controlled that are connected to the output side of the controller.

A group of sensors for air-conditioning control is connected to the input side of the air conditioning controller 40 to input detection signals therefrom to the controller. The group of sensors includes an inside air sensor, an outside air sensor, a solar radiation sensor, a discharge temperature sensor, a discharge pressure sensor, an evaporator temperature sensor, a ventilation air temperature sensor, and an exterior-heat-exchanger temperature sensor. The inside air sensor serves as an inside-air-temperature detector that detects a vehicle interior temperature (inside air temperature) Tr. The outside air sensor serves as an outside-air-temperature detector that detects a vehicle exterior temperature (outside air temperature) Tam. The solar radiation sensor serves as a solar-radiation amount detector that detects the solar radiation amount As applied to the vehicle interior. The discharge temperature sensor detects a discharge refrigerant temperature Td of the refrigerant discharged from the compressor 11. The discharge pressure sensor detects a discharge refrigerant pressure (high-pressure side refrigerant pressure) Pd of the refrigerant discharged from the compressor 11. The evaporator temperature sensor detects a refrigerant evaporation temperature (evaporator temperature) Tefin in the interior evaporator 20. The ventilation air temperature sensor detects a ventilation air temperature TAV of ventilation air to be blown from the mixing space into the vehicle interior. The exterior-heat-exchanger temperature sensor detects an exterior device temperature Ts of the exterior heat exchanger 15.

The evaporator temperature sensor of this embodiment is adapted to detect the temperature of a heat exchanging fin of the interior evaporator 20, but may adopt a temperature detector for detecting the temperature of another part of the interior evaporator 20.

The exterior-heat-exchanger temperature sensor of this embodiment is adapted to detect the temperature of refrigerant at a refrigerant outflow port of the exterior heat exchanger 15, but may adopt a temperature detector for detecting the temperature of another part of the exterior heat exchanger 15.

In this embodiment, the ventilation air temperature sensor is provided for detecting the ventilation air temperature TAV. Instead of this, the ventilation air temperature TAV for use may be a value calculated based on the evaporator temperature Tefin, the discharged refrigerant temperature Td, or the like.

The input side of the air conditioning controller 40 is connected to an operation panel (not shown) that is disposed near an instrument board at the front of the vehicle compartment. Operation signals from various operation switches provided on the operation panel are input to the input side of the air conditioning controller.

Specifically, various types of operation switches provided on the operation panel include an automatic switch, an air-cooling (A/C) switch, an air volume setting switch, a temperature setting switch, and a blow-out mode selector switch. The automatic switch is adapted to set or reset an automatic control operation of the vehicle air conditioner 1. The air-cooling (A/C) switch is adapted to perform the air-cooling of the vehicle interior. The air volume setting switch is adapted to manually set the volume of air from the blower 32. The temperature setting switch serves as a target temperature setting portion for setting a target temperature Tset of the vehicle interior. The blow-out mode selector switch serves to manually set a blow-out mode.

The air conditioning controller 40 of this embodiment is integrally structured with a control unit for controlling various devices of interest to be controlled connected to an output side of the controller. The control unit for controlling the operation of each of the devices of interest to be controlled includes a structure (hardware and software) designed to control the operation of each of the devices of interest to be controlled.

For example, in the air conditioning controller 40, the structure (hardware and software) for controlling a refrigerant discharge capacity (the number of revolutions of the compressor 11) of the compressor 11 configures a discharge capacity control portion 40*a*, and the structure for controlling the operation of the refrigerant circuit switching portion (in this embodiment the nozzle on-off valve 22) configures a refrigerant circuit control portion 40*b*. It is obvious that the discharge capacity control portion 40*a*, the refrigerant circuit control portion 40*b*, and the like may be configured as another separate controller with respect to the air conditioning controller 40.

Next, the operation of the above-mentioned structure in this embodiment will be described below. As mentioned above, the vehicle air conditioner 1 in this embodiment can switch its operation among the air-cooling operation mode, the dehumidification heating operation mode, the air-heating operation mode, and the strong-air-heating operation mode. Switching among these operation modes is performed by executing the air conditioning control program. The air conditioning control program is executed when the automatic switch on the operation panel is turned on (ON).

More specifically, the main routine of the air conditioning control program involves reading the detection signals from the above-mentioned sensor group for the air conditioning control, and the operation signals from the various air conditioning operation switches. A target air temperature TAO which is a target temperature of air to be blown into the vehicle interior is calculated based on the following formula F2, based on the values of the detection signals and the operation signals read.

$$TAO = Kset \times Tset - Kr \times Tr - Kam \times Tam - Ks \times As + C \quad (F2)$$

where Tset is a vehicle interior preset temperature set by the temperature setting switch, Tr is a vehicle interior temperature (inside air temperature) detected by the inside air sensor, Tam is an outside air temperature detected by the outside air sensor, and As is a solar radiation amount detected by the solar radiation sensor. The Kset, Kr, Kam, and Ks are control gains, and C is a constant for correction.

When the air-cooling switch on the operation panel is turned on, and the target air temperature TAO is lower than a predetermined air-cooling reference temperature α, the operation in the air-cooling mode is performed. When the air-cooling switch on the operation panel is turned on, and the target air temperature TAO is equal to or higher than a predetermined air-cooling reference temperature α, the operation in the dehumidification heating operation mode is performed.

On the other hand, when the air-cooling switch is not turned on, and the refrigerant discharge capacity of the compressor 11 (specifically, the number of revolutions Nc of the compressor 11) is less than the predetermined reference refrigerant discharge capacity (specifically, the reference number of revolutions KNc), the operation in the air-heating operation mode is performed. When the air-cooling switch is not turned on, and the refrigerant discharge capacity of the compressor 11 is equal to or higher than the reference refrigerant discharge capacity, the operation in the strong-air-heating operation mode is performed.

Note that the term "refrigerant discharge capacity of the compressor 11" as used herein can be defined as a value obtained by multiplication of the discharge refrigerant pressure Pd of the compressor 11 by the discharge refrigerant flow amount Gr of the compressor 11. Thus, the refrigerant discharge capacity of the compressor 11 has strong correlation with the number of revolutions Nc of the compressor 11.

In this embodiment, the number of revolutions Nc of the compressor 11 is used as the refrigerant discharge capacity of the compressor 11.

Thus, in this embodiment, when the outside air temperature is relatively high, mainly in summer, the operation in the air-cooling operation mode is performed, whereas mainly in early spring or early winter, the operation in the dehumidification heating operation mode is performed. Further, when the outside air temperature is relatively low, mainly in winter, the operation in the air-heating operation mode is performed. In particular, when the ventilation air needs to be heated with a higher heating capacity than that in the air-heating operation mode, at the low outside air temperature (for example, at the outside air temperature of −10° C. or lower), like in winter, the operation in the strong-air-heating operation mode is performed.

Now, a description will be given of the operation of each of the operation modes.

(A) Air-Cooling Operation Mode

In an air-cooling operation mode, the air conditioning controller 40 fully opens the heating expansion valve 14, brings the cooling expansion valve 16 into a throttle state of exhibiting the decompression effect, closes the heating on-off valve 18, and closes the nozzle on-off valve 22. Thus, the cycle configuration in the air-cooling operation mode is included in a non-pressurization refrigerant circuit described in the appended claims.

Thus, in the air-cooling operation mode, as indicated by outlined arrows in FIG. 1, the refrigeration cycle is formed that allows the refrigerant to circulate through the compressor 11, the interior condenser 12 (and the heating expansion valve 14), the exterior heat exchanger 15, the cooling expansion valve 16, the interior evaporator 20, the accumulator 19, the refrigerant suction port 21*d* of the ejector 21, the diffuser 21*f* of the ejector 21, and the compressor 11 in this order.

With such a refrigerant circuit configuration, the air conditioning controller 40 determines the operating states of the respective various devices to be controlled (control signals output to various devices to be controlled) based on the target air temperature TAO, the detection signals from the sensor group, and the like.

For example, the refrigerant discharge capacity of the compressor 11, that is, the control signal to be output to the electric motor of the compressor 11 is determined in the following way. First, a target evaporator outlet temperature TEO of the interior evaporator 20 is determined based on the target air temperature TAO with reference to the control map pre-stored in the air conditioning controller 40.

Specifically, the control map determines the target evaporator outlet temperature TEO such that the target evaporator outlet temperature TEO decreases with decreasing target air temperature TAO. Further, the target evaporator outlet temperature TEO is determined to be equal to or higher than a reference frost-formation preventing temperature (e.g., 1° C.), which is determined to be capable of suppressing the frost formation in the interior evaporator 20.

Then, a control signal to be output to the electric motor of the compressor 11 is determined based on a deviation between the target evaporator outlet temperature TEO and the evaporator temperature Tefin detected by the evaporator temperature sensor such that the evaporator temperature Tefin approaches the target evaporator outlet temperature TEO by the feedback control method.

The control signal output to the electric actuator for driving the air mix door 34 is determined such that the air mix door 34 closes an air passage on the side of the interior condenser 12, and that the whole ventilation air having passed through the interior evaporator 20 flows while bypassing the interior condenser 12. Note that in the air-cooling operation mode, the opening degree of the air mix door 34 may be controlled such that the ventilation air temperature TAV approaches the target air temperature TAO.

The control signal to be output to the cooling expansion valve 16 is determined such that a supercooling degree of the refrigerant flowing into the cooling expansion valve 16 approaches a target supercooling degree that is previously defined to substantially maximize the coefficient of performance (COP).

The control signals or the like determined as mentioned above are output to the respective various devices to be controlled. Then, a control routine is repeated until the operation of the vehicle air conditioner 1 is requested to stop. The control routine involves reading the above-mentioned detection signal and operation signal, calculating the target air temperature TAO, determining the operating state of each of various devices to be controlled, and outputting a control voltage and the control signal, for each predetermined control cycle. Such repetition of the control routine is also performed in other operation modes in the same way.

Thus, in the refrigeration cycle device 10 during the air-cooling operation mode, the high-pressure refrigerant discharged from the compressor 11 flows into the interior condenser 12. At this time, the air mix door 34 closes an air passage on the side of the interior condenser 12, so that the refrigerant entering the interior condenser 12 flows out of the interior condenser 12 without almost exchanging heat with the ventilation air.

The refrigerant exiting the interior condenser 12 flows into one of the refrigerant inflow and outflow ports of the exterior heat exchanger 15 via the heating expansion valve 14 fully opened. The refrigerant flowing into the exterior heat exchanger 15 dissipates heat into the outside air blown from the blower fan 15a in the exterior heat exchanger 15.

As the heating on-off valve 18 is closed, the refrigerant exiting the exterior heat exchanger 15 flows into the cooling expansion valve 16 to be decompressed into a low-pressure refrigerant via the second branch portion 13b. At this time, the valve opening degree of the cooling expansion valve 16 is adjusted such that the supercooling degree of the refrigerant flowing into the cooling expansion valve 16 approaches the target supercooling degree.

The refrigerant decompressed by the cooling expansion valve 16 flows into the interior evaporator 20 and exchanges heat with the ventilation air blown from the blower 32 to evaporate itself. In this way, the ventilation air is cooled, thereby achieving the air cooling of the vehicle interior. The refrigerant flowing out of the interior evaporator 20 flows into the accumulator 19 via the merging portion 13c to be separated into liquid and gas phases.

The gas-phase refrigerant separated by the accumulator 19 flows into the ejector 21 from the refrigerant suction port 21d of the ejector 21. The refrigerant flowing into the ejector 21 flows out of the diffuser 21f of the ejector 21 and is drawn into the compressor 11 to be compressed therein again.

As mentioned above, in the air-cooling operation mode, the ventilation air cooled by the interior evaporator 20 is blown into the vehicle interior, thereby enabling the air cooling of the vehicle interior.

Here, in the operation mode, such as the air-cooling operation mode, in which the nozzle on-off valve 22 is closed and the refrigeration cycle device 10 is switched to the non-pressurization refrigerant circuit, no refrigerant is injected from the nozzle portion 21a of the ejector 21. Thus, the suction refrigerant flowing through the refrigerant suction port 21d into the ejector 21 is not merged with the injection refrigerant to be accelerated.

Thus, in the operation mode of switching to the non-pressurization refrigerant circuit, the diffuser 21f cannot convert the kinetic energy of the mixed refrigerant accelerated more than the suction refrigerant, into the pressure energy. As a result, when switched to the non-pressurization refrigerant circuit, the ejector 21 serves as a refrigerant passage that guides the refrigerant from the refrigerant suction port 21d to the exit of the diffuser 21f without exhibiting the adequate pressurizing effect.

(b) Dehumidification Heating Operation Mode

In a dehumidification heating operation mode, the air conditioning controller 40 fully opens or brings into a throttle state, the heating expansion valve 14 and the cooling expansion valve 16, closes the heating on-off valve 18, and closes the nozzle on-off valve 22. Thus, the cycle structure formed in the dehumidification heating operation mode is included in a non-pressurization refrigerant circuit described in the appended claims.

In this way, in the dehumidification heating operation mode, as indicated by diagonal hatched arrows in FIG. 1, the refrigeration cycle is configured that allows the refrigerant to circulate through the compressor 11, the interior condenser 12, the heating expansion valve 14, the exterior heat exchanger 15, the cooling expansion valve 16, the interior evaporator 20, the accumulator 19, the refrigerant suction port 21d of the ejector 21, the diffuser 21f of the ejector 21, and the compressor 11 in this order.

That is, in the dehumidification heating operation mode, the refrigeration cycle is configured to allow the refrigerant to circulate through the components thereof in the substantially same order as in the air-cooling operation mode. With such a refrigerant circuit configuration, the air conditioning controller 40 determines the operating states of the respective devices to be controlled (control signals output to various devices to be controlled) based on the target air temperature TAO, the detection signals from the sensor group, and the like.

For example, the control signal to be output to the electric motor of the compressor 11 is determined in the same way as in the air-cooling operation mode. The control signal output to the servo motor of the air mix door 34 is determined such that the air mix door 34 closes the cool air bypass passage 35, allowing the whole ventilation air having passed through the interior evaporator 20 to pass through the air passage on the side of the interior condenser 12.

The heating expansion valve 14 and the cooling expansion valve 16 are modified according to the target air temperature TAO. Specifically, as the target air temperature TAO increases, the air conditioning controller 40 decreases the throttle opening degree of the heating expansion valve 14, and increases the throttle opening degree of the cooling expansion valve 16. Thus, in the dehumidification heating operation mode, four-staged operation modes from the first to fourth modes can be carried out as will be described below.

(b-1) First Mode

A first mode is performed when the target air temperature TAO is equal to or higher than a cooling reference temperature α, and equal to or lower than a first reference temperature previously determined in the dehumidification heating mode.

In the first mode, the air conditioning controller 40 fully opens the throttle opening degree of the heating expansion valve 14, and brings the cooling expansion valve 16 into the throttle state. Thus, the first mode has substantially the same cycle structure as that in the air cooling operation mode, but the air mix door 34 fully opens the air passage on the side of the interior condenser 12, which allows the interior condenser 12 to re-heat the ventilation air that is cooled by the interior evaporator 20 in the same way as that in the air-cooling operation mode.

As mentioned above, in the first mode, the ventilation air cooled and dehumidified by the interior evaporator 20 can be heated by the interior condenser 12 and blown into the vehicle interior. Thus, the dehumidification and heating of the vehicle interior can be achieved.

(b-2) Second Mode

A second mode is performed when the target air temperature TAO is higher than the first reference temperature and equal to or lower than a second reference temperature previously determined in the dehumidification heating operation mode. In the second mode, the air conditioning controller 40 brings the heating expansion valve 14 into a throttle state and increases the throttle opening degree of the cooling expansion valve 16 more than that in the first mode.

Thus, in the second mode, the ventilation air cooled and dehumidified by the interior evaporator 20 can be heated by the interior condenser 12 and blown into the vehicle interior, like the first mode. Thus, the dehumidification and heating of the vehicle interior can be achieved.

At this time, in the second mode, the heating expansion valve 14 is in the throttle state, so that the temperature of the refrigerant flowing into the exterior heat exchanger 15 can be decreased as compared to in the first mode. Thus, a difference between the refrigerant temperature in the exterior heat exchanger 15 and the outside air temperature can be decreased to reduce the amount of dissipation of heat from the refrigerant in the exterior heat exchanger 15.

As a result, the refrigerant pressure in the interior condenser 12 can be increased, compared to the first mode, without increasing the flow amount of the refrigerant circulating through the cycle, so that the temperature of the ventilation air blown from the interior condenser 12 can be increased more than that in the first mode.

(b-3) Third Mode

A third mode is performed when the target air temperature TAO is higher than the second reference temperature and equal to or lower than a third reference temperature previously determined in the dehumidification heating operation mode. In the third mode, the air conditioning controller 40 reduces the throttle opening degree of the heating expansion valve 14 more than that in the second mode, and increases the throttle opening degree of the cooling expansion valve 16 more than that in the second mode.

Thus, in the third mode, like the first and second modes, the ventilation air cooled and dehumidified by the interior evaporator 20 can be heated by the interior condenser 12 and blown into the vehicle interior. In this way, the dehumidification and heating of the vehicle interior can be performed.

At this time, in the third mode, the opening degree of the heating expansion valve 14 is decreased, causing the exterior heat exchanger 15 to function as an evaporator, so that the refrigerant can dissipate heat absorbed at the exterior heat exchanger 15, into the ventilation air at the interior condenser 12. Thus, the temperature of the ventilation air blown from the interior condenser 12 can be increased, compared to that in the second mode.

As a result, the refrigerant pressure in the interior condenser 12 can be raised, compared to the second mode, without increasing the flow amount of the refrigerant circulating through the cycle, so that the temperature of the ventilation air blown from the interior condenser 12 can be increased more than that in the second mode.

(b-4) Fourth Mode

A fourth mode is performed when the target air temperature TAO is higher than the third reference temperature in the dehumidification heating operation mode. In the fourth mode, the air conditioning controller 40 decreases the throttle opening degree of the heating expansion valve 14 as compared to in the third mode, thereby fully opening the cooling expansion valve 16.

Thus, in the fourth mode, like the first to third modes, the ventilation air cooled and dehumidified by the interior evaporator 20 can be heated by the interior condenser 12 and blown into the vehicle interior. In this way, the dehumidification and heating of the vehicle interior can be performed.

At this time, in the fourth mode, the exterior heat exchanger 15 serves as an evaporator like the third mode, while the throttle opening degree of the heating expansion valve 14 is reduced as compared to that in the third mode, which can decrease the refrigerant evaporation temperature in the exterior heat exchanger 15. Thus, a difference between the refrigerant temperature in the exterior heat exchanger 15 and the outside air temperature can be enlarged as compared to in the third mode, thereby increasing the amount of heat absorbed by the refrigerant in the exterior heat exchanger 15.

As a result, the refrigerant pressure in the interior condenser 12 can be raised, compared to the third mode, without increasing the flow amount of the refrigerant circulating through the cycle, so that the temperature of the ventilation air blown from the interior condenser 12 can be increased more than that in the third mode.

As mentioned above, in the dehumidification heating operation mode, the throttle opening degrees of the heating expansion valve 14 and the cooling expansion valve 16 are changed according to the target air temperature TAO, causing the exterior heat exchanger 15 to function as the radiator or evaporator, thereby enabling adjustment of the temperature of ventilation air to be blown into the vehicle interior.

(d) Air-Heating Operation Mode

In the air-heating operation mode, the air conditioning controller 40 brings the heating expansion valve 14 into a throttle state, completely closes the cooling expansion valve 16, opens the heating on-off valve 18, and closes the nozzle on-off valve 22. Thus, the cycle structure formed in the air-heating operation mode is included in a non-pressurization refrigerant circuit described in the appended claims.

In this way, in the air-heating operation mode, as indicated by shaded-hatched arrows in FIG. 1, the refrigeration cycle is configured that allows the refrigerant to circulate through the compressor 11, the interior condenser 12, the heating expansion valve 14, the exterior heat exchanger 15, (the accumulator-side passage 17), the accumulator 19, the refrigerant suction port 21d of the ejector 21, the diffuser 21f of the ejector 21, and the compressor 11 in this order.

With such a refrigerant circuit configuration, the air conditioning controller 40 determines the operating states of the respective devices to be controlled (control signals output to various devices to be controlled) based on the target air temperature TAO, the detection signals from the sensor group, and the like.

For example, the refrigerant discharge capacity of the compressor 11, that is, the control signal to be output to the electric motor of the compressor 11 is determined in the following way. First, a target condenser temperature TCO of the interior condenser 12 is determined based on the target air temperature TAO with reference to the control map pre-stored in the air conditioning controller 40. Specifically, the control map determines the target condenser temperature TCO such that the target condenser temperature TCO increases with increasing target air temperature TAO.

Then, the control signal output to the electric motor of the compressor 11 is determined in such a manner as to make the discharge refrigerant temperature Td approach the target condenser temperature TCO using the feedback control method and to suppress abnormal increase in high-pressure side refrigerant pressure Pd, based on a deviation between the target condenser temperature TCO and the discharge refrigerant temperature Td detected by the discharge temperature sensor.

The control signal output to the servo motor of the air mix door 34 is determined such that the air mix door 34 closes the cool air bypass passage 35, allowing the whole ventilation air having passed through the interior evaporator 20 to pass through the air passage on the side of the interior condenser 12.

The control signal to be output to the heating expansion valve 14 is determined such that a supercooling degree of the refrigerant flowing into the heating expansion valve 14 approaches a target supercooling degree that is previously defined to substantially maximize the COP.

Thus, in the refrigeration cycle device 10 during the air-heating operation mode, the high-pressure refrigerant discharged from the compressor 11 flows into the interior condenser 12. The refrigerant flowing into the interior condenser 12 exchanges heat with the ventilation air blown from the blower 32 and passing through the interior evaporator 20 to dissipate heat therefrom. In this way, the ventilation air is heated.

The refrigerant flowing out of the interior condenser 12 flows into the heating expansion valve 14 to be decompressed into a low-pressure refrigerant. At this time, the valve opening degree of the heating expansion valve 14 is adjusted such that the supercooling degree of the refrigerant flowing into the heating expansion valve 14 approaches the target supercooling degree. The low-pressure refrigerant decompressed by the heating expansion valve 14 flows into the exterior heat exchanger 15 and absorbs heat from the outside air blown from the blower fan 15a.

As the heating on-off valve 18 is open, and the cooling expansion valve 16 is completely closed, the refrigerant flowing out of the exterior heat exchanger 15 flows into the accumulator 19 via the accumulator-side passage 17 to be separated into gas and liquid phase refrigerants. The gas-phase refrigerant separated by the accumulator 19 is sucked into the compressor 11 via the ejector 21 and compressed again therein, like in the air-cooling operation mode and the dehumidification heating operation mode.

As mentioned above, in the air-heating operation mode, the ventilation air heated by the interior condenser 12 is blown into the vehicle interior, thereby enabling the air heating of the vehicle interior.

Here, in the refrigeration cycle device 10 of this embodiment, in the air-heating operation mode, the heat absorbed by the refrigerant from the outside air as the heat-absorption target fluid at the exterior heat exchanger 15 is dissipated into the ventilation air at the interior condenser 12, thereby heating the ventilation air.

In such a cycle structure, the refrigerant evaporation temperature in the exterior heat exchanger 15 must be reduced compared to the outside air temperature. For example, when the outside air temperature is low, the refrigerant evaporation temperature at the exterior heat exchanger 15 must be decreased to the ultralow temperature (e.g., −10° C. or less) in some cases.

However, when the refrigerant evaporation temperature in the exterior heat exchanger 15 is reduced to the ultralow temperature, the suction refrigerant flowing out of the exterior heat exchanger 15 to be drawn into the compressor 11 decreases its pressure, thus reducing the density of the suction refrigerant. As a result, the radiator-side refrigerant flow amount Gc of the refrigerant discharged from the compressor 11 to flow into the interior condenser 12 might be decreased, thus reducing the heating capacity of the interior condenser 12 for the ventilation air.

Note that the heating capacity for the ventilation air (heating target fluid) in the interior condenser 12 can be defined by using multiplying a difference in enthalpy of the refrigerant between the inlet and outlet sides of the interior condenser 12, by a flow amount (radiator-side refrigerant flow amount Gc) of the refrigerant circulating through the interior condenser 12.

The refrigeration cycle device 10 in this embodiment carries out the strong-air-heating operation mode, as described later, provided that the refrigeration cycle device 10 is under the operation conditions in which the refrigerant evaporation temperature at the exterior heat exchanger 15 must be reduced to the ultralow temperature when the refrigerant discharge capacity of the compressor 11 is equal to or higher than a reference refrigerant discharge capacity.

(d) Strong-Air-Heating Operation Mode

In the strong-air-heating operation mode, the air conditioning controller 40 brings the heating expansion valve 14 into a throttle state, completely closes the cooling expansion valve 16, opens the heating on-off valve 18, and opens the nozzle on-off valve 22. Thus, the cycle structure formed in the strong-air-heating operation mode of this embodiment is included in a pressurization refrigerant circuit described in the appended claims.

In this way, in the strong-air-heating operation mode, as indicated by the black arrows in FIG. 1, the refrigeration cycle is configured that allows the refrigerant to circulate through the compressor 11, the interior condenser 12, the heating expansion valve 14, the exterior heat exchanger 15, (the accumulator-side passage 17), the accumulator 19, and the refrigerant suction port 21d of the ejector 21 in this order, while allowing the refrigerant to flow from the compressor 11 to the nozzle portion 21a of the ejector 21, the diffuser 21f of the ejector 21, and the compressor 11 in this order.

With such a refrigerant circuit configuration, the air conditioning controller 40 determines the operating states of various devices to be controlled (control signals output to various devices to be controlled) based on the target air temperature TAO, the detection signals from the sensor group, etc., like the air-heating operation mode.

Figure 3:
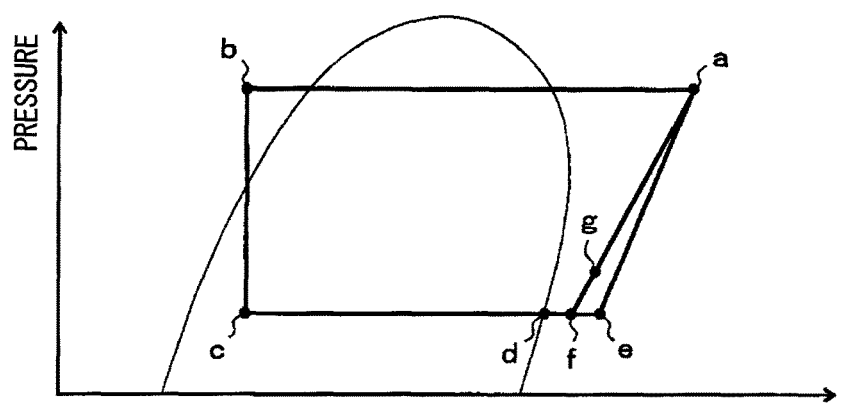
FIG. 3 is a Mollier chart showing changes of the state of refrigerant in a strong-air-heating operation mode of the refrigeration cycle device in the first embodiment.

Thus, the refrigeration cycle device 10 in the strong-air-heating operation mode changes the state of the refrigerant circulating through the cycle as illustrated in a Mollier chart of FIG. 3. Specifically, the flow of the high-pressure refrigerant discharged from the compressor 11 (indicated by a point a in FIG. 3) is branched at the first branch portion 13a. One of the branched refrigerants flows into the interior condenser 12.

The refrigerant flowing into the interior condenser 12 exchanges heat with the ventilation air blown from the blower 32 and passing through the interior evaporator 20 to thereby dissipate heat therefrom (as indicated from the point a to a point b in FIG. 3). In this way, the ventilation air is heated. The refrigerant exiting the interior condenser 12 flows into the heating expansion valve 14 to be decompressed into a low-pressure refrigerant (as indicated from the point b to a point c in FIG. 3), like the air-heating operation mode.

The low-pressure refrigerant decompressed by the heating expansion valve 14 flows into the exterior heat exchanger 15 and absorbs heat from the outside air blown from the blower fan 15a to be evaporated itself in the same way as in the air-heating operation mode. The refrigerant exiting the exterior heat exchanger 15 flows into the accumulator 19 and is then separated into liquid and gas phases (as indicated from the point c to a point d in FIG. 3).

The other refrigerant branched by the first branch portion 13a (a part of the refrigerant discharged from the compressor 11) flows into the nozzle portion 21a of the ejector 21 and is isentropically decompressed to be injected (as indicated from the point a to a point e in FIG. 3). The gas-phase refrigerant separated by the accumulator 19 (as indicated at the point d in FIG. 3) is drawn through the refrigerant suction port 21d of the ejector 21 by a suction effect of the injection refrigerant.

The injection refrigerant injected from the nozzle portion 21a and the suction refrigerant sucked from the refrigerant suction port 21d flow into the diffuser 21f (as indicated from the point e to a point f and from the point d to the point f in FIG. 3). The diffuser 21f converts the velocity energy of the mixed refrigerant into the pressure energy thereof by increasing the refrigerant passage area.

In this way, the pressure of the mixed refrigerant including the injection refrigerant and the suction refrigerant is raised (as indicated from the point f to a point g in FIG. 3). The refrigerant (as indicated by the point g in FIG. 3) flowing out of the diffuser 21f of the ejector 21 is drawn into the compressor 11 to be compressed therein again.

As mentioned above, in the strong-air-heating operation mode, the ventilation air heated by the interior condenser 12 is blown into the vehicle interior, thereby enabling the air-heating of the vehicle interior.

Further, in the strong-air-heating operation mode, the nozzle on-off valve 22 is open, and the refrigeration cycle device 10 is switched to the pressurization refrigerant circuit, whereby the pressure of the suction refrigerant (at the point g in FIG. 3) drawn into the compressor 11 can be raised to a higher level than the refrigerant pressure (at the point d in FIG. 3) in the accumulator 19 by the pressurization effect of the ejector 21 (that is, the suction refrigerant pressure is increased more than the refrigerant evaporation pressure in the exterior heat exchanger 15 serving as the evaporator), thereby increasing the density of the suction refrigerant.

Thus, in the strong-air-heating operation mode, the decrease in radiator-side refrigerant flow amount Gc into the interior condenser 12 can be suppressed even under the operation conditions in which the refrigerant evaporation temperature at the exterior heat exchanger 15 must be decreased to the ultralow temperature because of the low outside air temperature. That is, the refrigeration cycle device 10 of this embodiment can suppress reduction in the heating capacity of the interior condenser 12 for the ventilation air due to a low temperature of the outside air as the heat-absorption target fluid.

Figure 4:
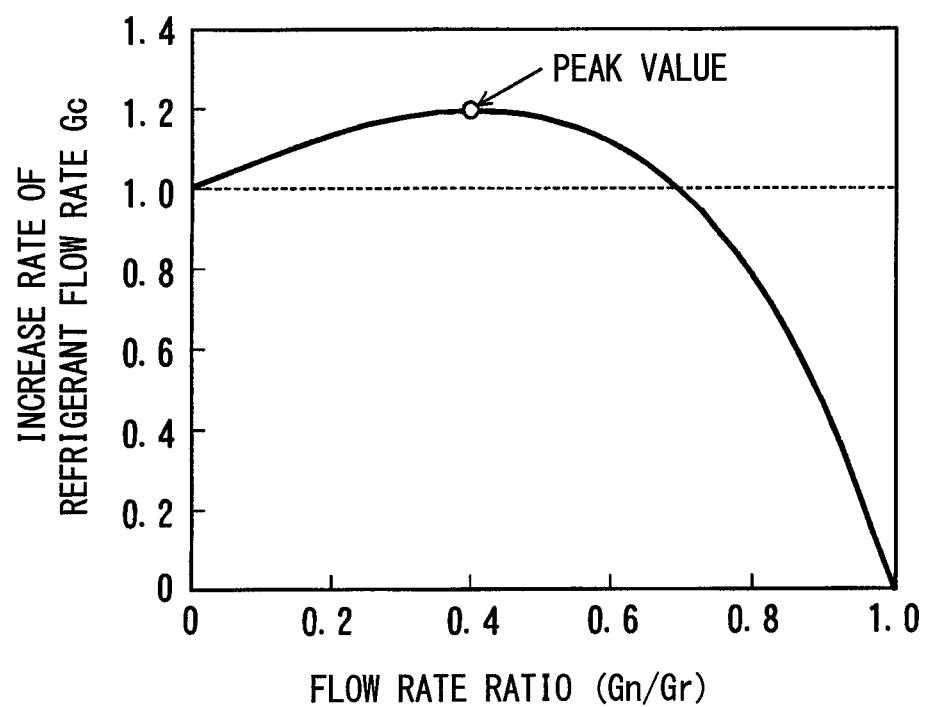
FIG. 4 is a graph showing changes in increase amount of the radiator-side refrigerant flow amount Gc relative to changes in flow amount ratio (Gn/Gr).

As can be seen from the studies by the inventors, when the flow amount ratio (Gn/Gr) of the ejector-side refrigerant flow amount Gn to the discharge refrigerant flow amount Gr changes in the strong-air-heating operation mode, the increase rate of the radiator-side refrigerant flow amount Gc also changes as shown in FIG. 4.

More specifically, referring to FIG. 4, the state of the flow amount ratio (Gn/Gr)=0 means that the whole amount of the refrigerant discharged from the compressor 11 flows out to the side of the interior condenser 12. The longitudinal axis of FIG. 4 represents the increase rate of the radiator-side refrigerant flow amount Gc when setting the refrigerant flow amount to one (=1) at the flow amount ratio (Gn/Gr)=0.

As can be seen from FIG. 4, in the strong-air-heating operation mode, in a range of the flow amount ratio (Gn/Gr) of more than 0 and less than 0.7, the increase rate of the radiator-side refrigerant flow amount Gc becomes 1 or more, and the radiator-side refrigerant flow amount Gc from the first branch portion 13a into the interior condenser 12 side is increased more than the case in which the whole amount of refrigerant discharged from the compressor 11 flows into the interior condenser 12 side.

On the other hand, in this embodiment as mentioned above, in the strong-air-heating operation mode, the decompression characteristics (flow amount characteristics) of the nozzle portion 21a of the ejector 21 is determined such that the flow amount ratio (Gn/Gr) satisfies the above-mentioned formula F1. Therefore, in the strong-air-heating operation mode, this embodiment can surely increase the radiator-side refrigerant flow amount Gc, thereby completely suppressing reduction in heating capacity of the interior condenser 12.

In the refrigeration cycle device 10 for heating ventilation air in the interior condenser 12, like the air-heating operation mode or the strong-air-heating operation mode of this embodiment, the refrigerant evaporation temperature in the exterior heat exchanger 15 serving as the evaporator is decreased with increasing refrigerant discharge capacity of the compressor 11 (specifically, the number of revolutions of the compressor 11).

Thus, in the cycle device such as that in this embodiment, when the number of revolutions Nc of the compressor 11 is equal to or more than a predetermined reference number of revolutions KNc, the refrigerant circuit for the air-heating operation mode is switched to that for the strong-air-heating operation mode (that is, the non-pressurization refrigerant circuit is switched to the pressurization refrigerant circuit). As a result, the control of switching to the refrigerant circuit for the strong-air-heating operation mode can be achieved easily under the operating conditions in which the refrigerant evaporation temperature at the exterior heat exchanger 15 is reduced to the ultralow temperature.

When the refrigerant discharge capacity of the compressor 11 is equal to or more than the reference refrigerant discharge capacity, the refrigerant circuit for the air-heating operation mode is switched to that for the strong-air-heating operation mode. As a result, when the thermal load on the refrigeration cycle device 10 is increased, for example, when quick air-heating is intended to be performed upon start-up of the vehicle air conditioner 1, the radiator-side refrigerant flow amount Gc is increased to enable improvement of the heating capacity of the interior condenser 12 for the ventilation air.

The refrigeration cycle device 10 of this embodiment employs the nozzle on-off valve 22 disposed upstream of the refrigerant flow relative to the nozzle portion 21a, as an opening/closing component for opening and closing the refrigerant flow path in which the refrigerant circulates through the nozzle portion 21a, so that the refrigerant circuit switch can be very easily configured.

The refrigeration cycle device 10 in this embodiment includes the accumulator 19 as the gas-liquid separator, and the refrigerant suction port 21d of the ejector 21 is connected to the gas-phase refrigerant outflow port of the accumulator 19, which can surely prevent liquid compression from occurring in the compressor 11 coupled to the downstream side of the refrigerant flow in the ejector 21.

Second Embodiment

Figure 5:
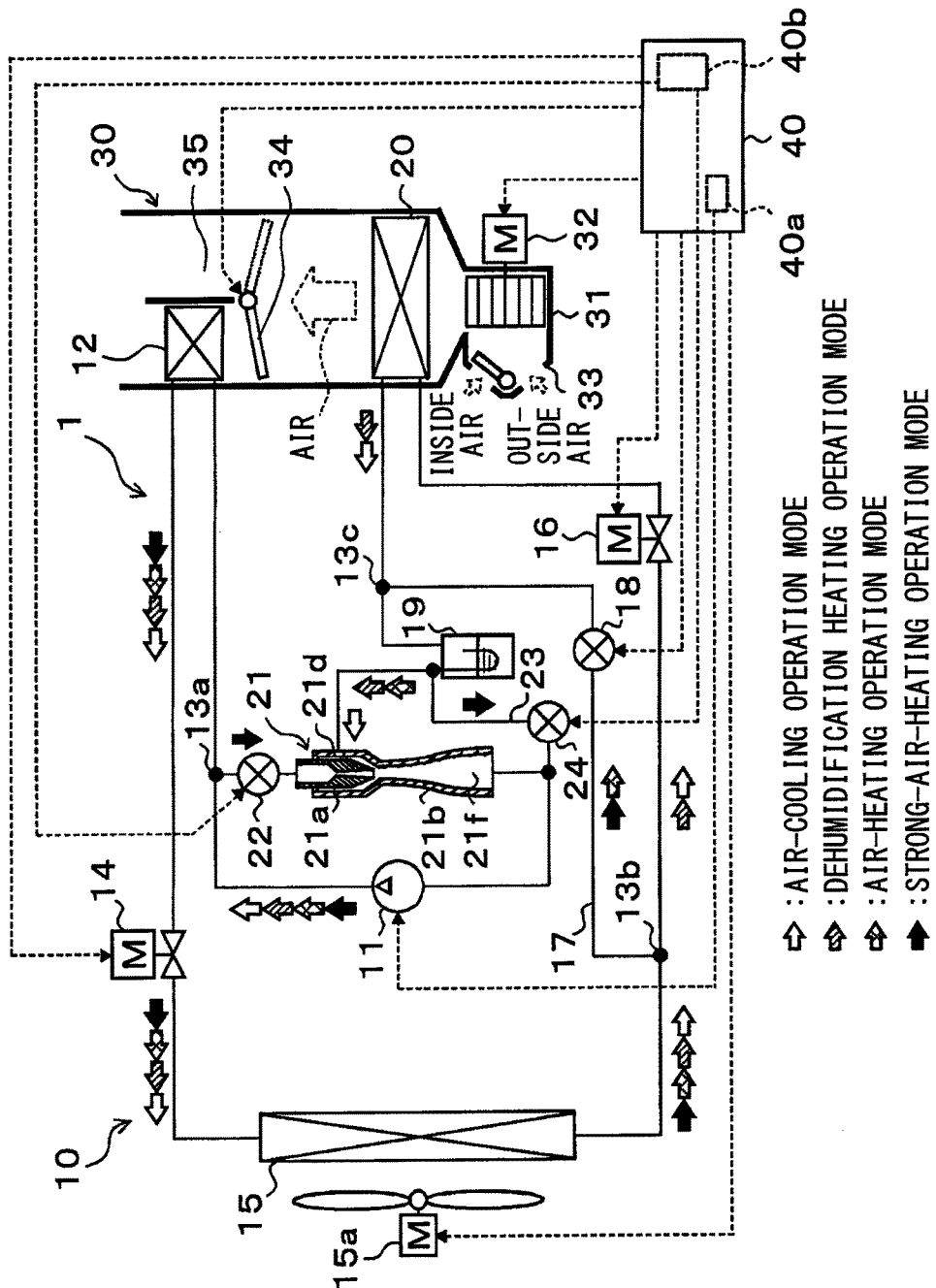
FIG. 5 is an entire configuration diagram of a refrigeration cycle device according to a second embodiment.

As shown in the entire configuration diagram of FIG. 5, this embodiment will explain an example in which a bypass passage 23 and a bypass-passage on-off valve 24 are added to the refrigeration cycle device 10 in the first embodiment. Referring to FIG. 5, the same or equivalent parts as those described in the first embodiment are designated by the same reference numerals. The same goes for the following figures.

More specifically, the bypass passage 23 is a refrigerant pipe that guides the gas-phase refrigerant flowing out of the gas-phase refrigerant outflow port of the accumulator 19 to the suction port side of the compressor 11 while bypassing the ejector 21. The bypass-passage on-off valve 24 is an opening/closing component for opening and closing the bypass passage 23.

The bypass passage 23 employs the refrigerant pipe having a relatively large pipe diameter. The pressure loss generated when the refrigerant circulates through the bypass passage 23 is set smaller than that generated when the refrigerant circulates through a refrigerant flow path that leads from the gas-phase refrigerant outflow port of the accumulator 19 to the suction port of the compressor 11 via the ejector 21.

The bypass-passage on-off valve 24 is configured of an electromagnetic valve of a non-energization opened type (of the so-called normal opened type). The bypass-passage on-off valve 24 has its operation controlled by a control voltage output from the air conditioning controller 40. In this embodiment, the nozzle on-off valve 22 and the bypass-passage on-off valve 24 configure the refrigerant circuit switch.

In more detail, the air conditioning controller 40 opens the nozzle on-off valve 22 and closes the bypass-passage on-off valve 24, thereby enabling switching to the pressurization refrigerant circuit. The nozzle on-off valve 22 is closed, and the bypass-passage on-off valve 24 is opened, thereby enabling switching to the non-pressurization refrigerant circuit. The structures of other components in this embodiment are the same as those in the first embodiment.

Next, the operation of the above-mentioned structure in this embodiment will be described below. In this embodiment, in the strong-air-heating operation mode, the air conditioning controller 40 opens the nozzle on-off valve 22 and closes the bypass-passage on-off valve 24. In other operation modes, the refrigerant circuit control portion 40b closes the nozzle on-off valve 22 and opens the bypass-passage on-off valve 24. Other operations in this embodiment are the same as those in the first embodiment.

Thus, even when the refrigerant circuit switch is configured of the nozzle on-off valve 22 and the bypass-passage on-off valve 24, the refrigeration cycle device, like the refrigeration cycle device 10 of this embodiment, can switch to the substantially same refrigerant circuit as that in each of the operation modes of the first embodiment, and thus can operate in the same manner as in the first embodiment. As a result, the same effects as those of the refrigeration cycle device 10 in the first embodiment can be obtained.

In the refrigeration cycle device 10 of this embodiment, when switching to the refrigerant circuit in any operation mode other than the strong-air-heating operation mode, the gas-phase refrigerant flowing out of the gas-phase refrigerant outflow port of the accumulator 19 is guided to the suction port side of the compressor 11 via the bypass passage 23. Thus, this refrigerant circuit can reduce the pressure loss generated by the refrigerant circulating through the cycle more than that generated in the refrigerant circuit which guides the refrigerant to the suction port side of the compressor 11 via the ejector 21. As a result, this embodiment can reduce the power consumption of the compressor 11, thereby improving the coefficient of performance (COP) of the cycle.

Third Embodiment

Figure 6:
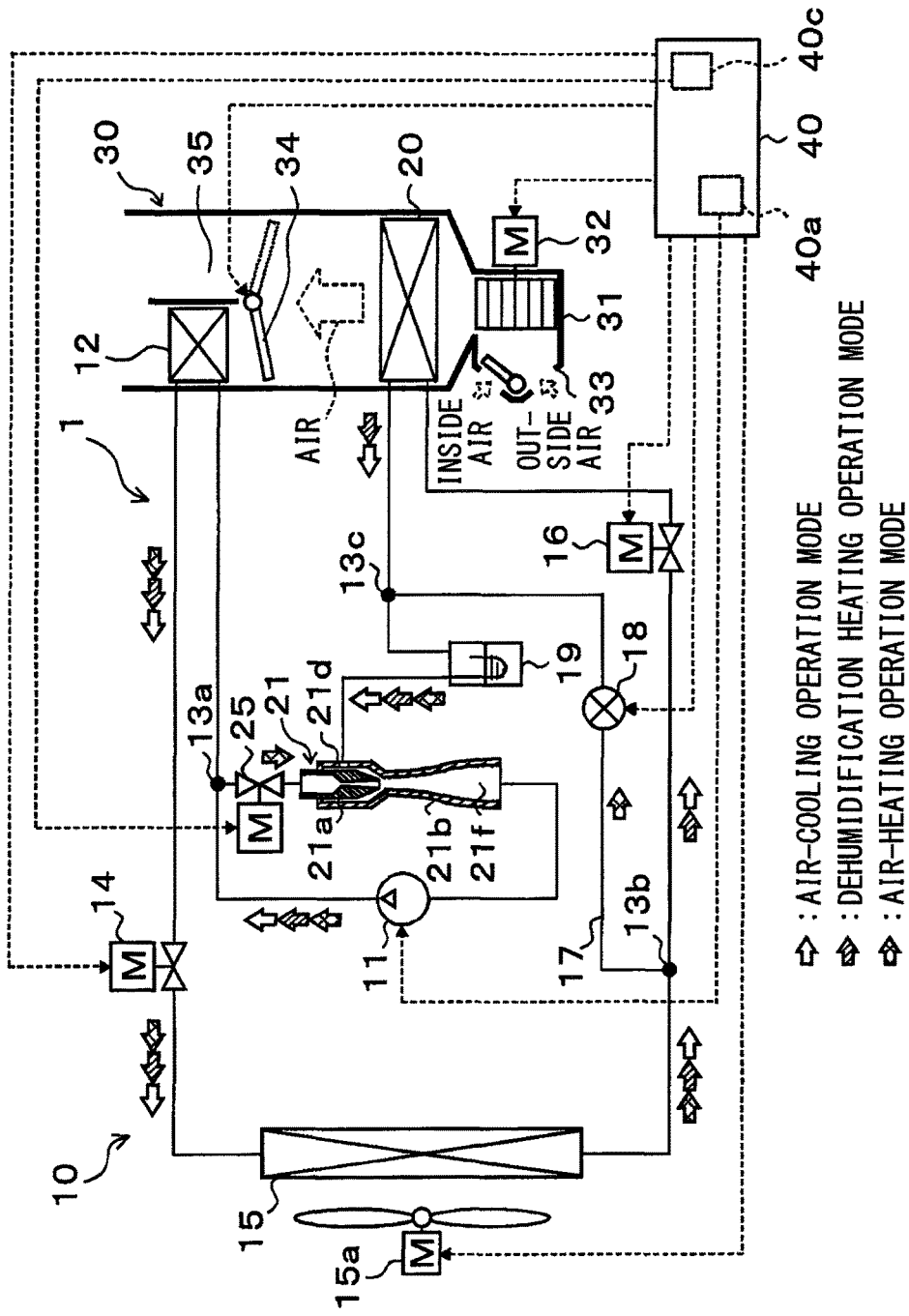
FIG. 6 is an entire configuration diagram of a refrigeration cycle device according to a third embodiment.

As shown in the entire configuration diagram of FIG. 6, this embodiment will explain an example in which the nozzle on-off valve 22 as the refrigerant circuit switch is abolished, and a flow-amount adjustment valve 25 is provided for adjusting the ejector-side refrigerant flow amount Gn of the refrigerant flowing into the nozzle portion 21a of the ejector 21, compared to the refrigeration cycle device 10 in the first embodiment.

The flow-amount adjustment valve 25 has the substantially same basic structure as that of the cooling expansion valve 16 and is configured of a variable throttle mechanism with a completely closing function. The flow-amount adjustment valve 25 can adjust the ejector-side refrigerant flow amount Gn, thereby changing the flow amount ratio (Gn/Gr) of the ejector-side refrigerant flow amount Gn to the discharge refrigerant flow amount Gr. Thus, the flow-amount adjustment valve 25 of this embodiment configures a flow-amount ratio adjustment portion.

The flow-amount adjustment valve 25 has its operation controlled by a control voltage output from the air conditioning controller 40. Thus, in this embodiment, the structure (hardware and software) that controls the operation of the flow-amount adjustment valve 25 in the air conditioning controller 40 configures a flow-amount ratio control portion 40c. The structures of other components in this embodiment are the same as those in the first embodiment.

Next, the operation of the above-mentioned structure in this embodiment will be described below. In the air-cooling operation mode of the refrigeration cycle device 10 in this embodiment, the air conditioning controller 40 fully opens the heating expansion valve 14, brings the cooling expansion valve 16 into a throttle state of exhibiting the decompression effect, closes the heating on-off valve 18, and completely closes the flow-amount adjustment valve 25. Thus, in the air-cooling operation mode, the completely same cycle as that that in the first embodiment can be configured to operate in the exactly same manner as in the first embodiment.

In the dehumidification heating operation mode, the air conditioning controller 40 fully opens or brings into a throttle state, the heating expansion valve 14 and the cooling expansion valve 16, closes the heating on-off valve 18, and completely closes the flow-amount adjustment valve 25. Thus, in the dehumidification heating operation mode, the completely same cycle as that that in the first embodiment can be configured to operate in the exactly same manner as in the first embodiment.

In the refrigeration cycle device 10 of this embodiment, if the strong-air-heating operation mode is not set with an automatic switch being turned on (in the ON state) while an air-cooling switch is not turned on, the operation in the air-heating operation mode is performed regardless of the refrigerant discharge capacity of the compressor 11.

In the air-heating operation mode of this embodiment, the air conditioning controller 40 brings the heating expansion valve 14 into a throttle state, completely closes the cooling expansion valve 16, and opens the heating on-off valve 18. Further, the air conditioning controller 40 controls the operation of the flow-amount adjustment valve 25 in such a manner that a real radiator-side refrigerant flow amount Gc of the refrigerant actually flowing into the interior condenser 12 is equal to or more than a radiator-side refrigerant flow amount Gc determined when the flow amount ratio (Gn/Gr) becomes zero (0) (that is, such that the increase rate of the radiator-side refrigerant flow amount Gc is equal to or more than 1).

Here, as mentioned above with reference to FIG. 4, the radiator-side refrigerant flow amount Gc can be increased by adequate adjustment of the flow amount ratio (Gn/Gr) under the operation conditions in which the refrigerant evaporation temperature at the exterior heat exchanger 15 must be decreased to the ultralow temperature because of the low outside air temperature. If the flow amount ratio (Gn/Gr) is excessively increased, the radiator-side refrigerant flow amount Gc might be reduced.

That is, as shown in FIG. 4, the increase rate of the radiator-side refrigerant flow amount Gc has its own maximum value (peak value) in response to the change in flow amount ratio (Gn/Gr). For this reason, the air conditioning controller 40 of this embodiment is adapted to control the operation of the flow-amount adjustment valve 25 in such a manner that the increase rate of the radiator-side refrigerant flow amount Gc approaches the maximum value thereof.

Note that the term "maximum value of the increase rate of the radiator-side refrigerant flow amount Gc" as used in this embodiment means the maximum value of the increase rate of the radiator-side refrigerant flow amount Gc when the flow amount ratio (Gn/Gr) changes in an available range. Thus, for example, when the refrigerant discharge capacity of the compressor 11 becomes relatively low, the increase rate of the radiator-side refrigerant flow amount Gc can be maximized at the time of the flow amount ratio (Gn/Gr) of zero (=0).

Accordingly, the air conditioning controller 40 of this embodiment determines the target flow amount ratio that sets the increase rate of the radiator-side refrigerant flow amount Gc close to the maximum value thereof on the basis of the refrigerant discharge capacity of the compressor 11 (specifically, the number of revolutions Nc of the compressor 11) with reference to the control map pre-stored in the air conditioning controller 40. Further, the air conditioning controller 40 controls the operation of the flow-amount adjustment valve 25 such that the flow amount ratio (Gn/Gr) approaches the target flow amount ratio.

By performing such control, the flow-amount adjustment valve 25 is completely closed to set the flow amount ratio (Gn/Gr) to zero (=0), for example, when the number of revolutions Nc of the compressor 11 is lower than the reference number of revolutions KNc, so that the completely same cycle as that in the air-heating operation mode of the first embodiment can be configured to operate in the same manner as that in the air-heating operation mode of the first embodiment.

When the number of revolutions Nc of the compressor 11 is equal to or more than the reference number of revolutions KNc, for example, the opening degree of the flow-amount adjustment valve 25 is adjusted to set the flow amount ratio (Gn/Gr) to approximately 0.4, so that the completely same cycle as that in the strong-air-heating operation mode of the first embodiment can be configured to operate in the same manner as that in the strong-air-heating operation mode of the first embodiment.

Thus, the refrigeration cycle device 10 in this embodiment can increase the density of the suction refrigerant drawn by the compressor 11 by the pressurizing effect of the ejector 21 even when the temperature of the outside air as the heat-absorption target fluid is reduced. As a result, this embodiment can suppress the reduction in heating capacity of the interior condenser 12, thereby achieving the same effects as those in the first embodiment.

Further, the refrigeration cycle device 10 of this embodiment controls the operation of the flow-amount adjustment valve 25 as the flow-amount ratio adjustment portion such that the increase rate of the radiator-side refrigerant flow amount Gc approaches the maximum value thereof. Thus, the refrigeration cycle device 10 can effectively suppress the reduction in heating capacity of the interior condenser 12.

Other Embodiments

The present invention is not limited to the above embodiments, and various modifications and changes can be made to those embodiments without departing from the scope of the invention as described below.

(1) Although in the above-mentioned first and second embodiments, the refrigeration cycle device 10 is capable of switching between the air-heating operation mode and the strong-air-heating operation mode, the refrigeration cycle device 10 of the present invention may be capable of operating in at least the strong-air-heating operation mode. In this case, the refrigeration cycle device 10 that performs only the operation in the strong-air-heating operation mode may abolish the refrigerant circuit switch. In the second embodiment, the nozzle on-off valve 22 may be abolished, and the bypass-passage on-off valve 24 may switch the refrigerant circuit.

(2) Although the above first embodiment employs, as the refrigerant circuit switch, an opening/closing component (nozzle on-off valve 22) for opening and closing the refrigerant passage that connects the other refrigerant outflow port of the first branch portion 13a to the refrigerant inflow port of the nozzle portion 21a of the ejector 21 by way of example, the refrigerant circuit switch is not limited thereto.

That is, any other type of opening/closing component may be employed as this kind of device as long as it can open and close the refrigerant flow path for the refrigerant circulating through the nozzle portion 21a to thereby switch between an injection state of the refrigerant from the nozzle portion 21a and a non-injection state of the refrigerant therefrom. For example, the opening/closing component for opening and closing the refrigerant passage formed in the nozzle portion 21a may be employed to integrate the refrigerant circuit switch with the ejector 21.

Although the above-mentioned second embodiment employs as the refrigerant circuit switch, the opening/closing component (bypass-passage on-off valve 24) for opening and closing the bypass passage 23 by way of example, the refrigerant circuit switch is not limited thereto. For example, a three-way valve may be employed as this kind of opening/closing device. The three-way valve may be disposed on the inlet side of the bypass passage 23 and adapted to switch between a refrigerant circuit for allowing the gas-phase refrigerant exiting the accumulator 19 to flow toward the refrigerant suction port 21d of the ejector 21 and another refrigerant circuit for allowing the above gas-phase refrigerant to flow toward the side of the bypass passage 23.

(3) Although the above third embodiment employs, as the flow-amount ratio adjustment portion, the flow-amount adjustment valve 25 disposed in the refrigerant passage that connects the other refrigerant outflow port of the first branch portion 13a to the refrigerant inflow port of the nozzle portion 21a of the ejector 21 by way of example, the flow-amount ratio adjustment portion is not limited thereto. For example, a variable nozzle capable of adjusting the refrigerant passage area may be employed as the nozzle portion 21a of the ejector 21, thereby integrating the flow-amount ratio adjustment portion with the ejector 21.

Figure 7:
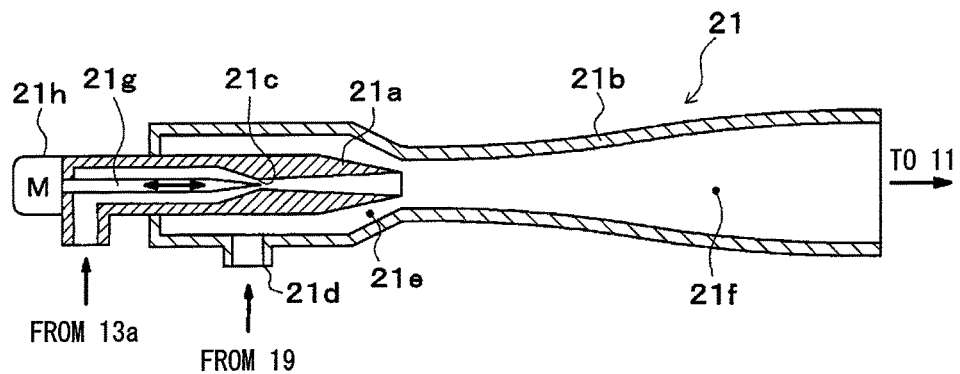
FIG. 7 is a cross-sectional view of an ejector in an axial direction thereof in another embodiment.

Specifically, as shown in FIG. 7, the ejector 21 or the like can be employed which includes a needle valve 21g and a stepping motor 21h. The needle valve 21g is disposed in the refrigerant passage of the nozzle portion 21a to change the refrigerant passage area of a throat portion 21c. The stepping motor 21h serves as a driving device that displaces the needle valve 21g in the axial direction of the nozzle portion 21a.

Figure 8:
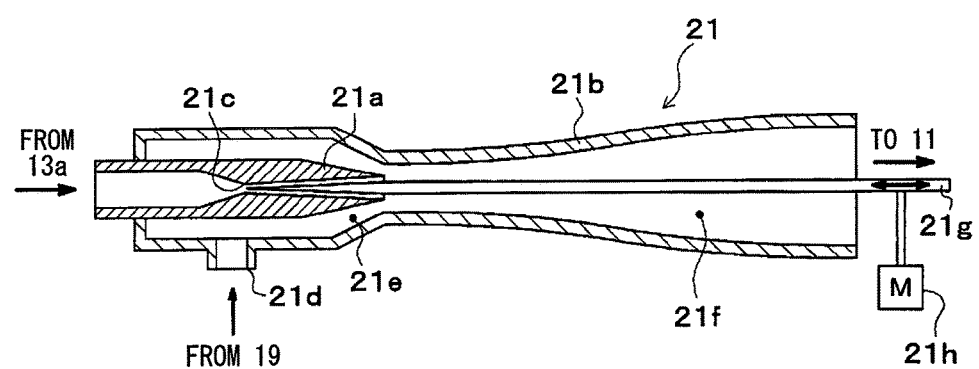
FIG. 8 is a cross-sectional view of an ejector in an axial direction thereof in a modified example of another embodiment.

If the needle valve 21g is configured to be abutted against the inner peripheral wall surface of the refrigerant passage in the nozzle portion 21a to enable closing of the refrigerant passage of the nozzle portion 21a, the ejector can be used which incorporates therein the above-mentioned refrigerant circuit switch. In a modified example shown in FIG. 8, the needle valve 21g may be used which is disposed downstream of the refrigerant flow relative to the throat portion 21c and is tapered toward the throat portion 21c from the downstream side of the refrigerant flow with respect to the throat portion 21c.

(4) In the above-mentioned first and second embodiments, the refrigerant circuit control portion 40b switches from the non-pressurization refrigerant circuit to the pressurization refrigerant circuit when the refrigerant discharge capacity of the compressor 11 is equal to or higher than the reference refrigerant discharge capacity by way of example. However, the control of the refrigerant circuit switch by the refrigerant circuit control portion 40b is not limited thereto.

For example, the refrigerant circuit control portion 40b may switch from the non-pressurization refrigerant circuit to the pressurization refrigerant circuit when the outside air temperature Tam becomes equal to or lower than a predetermined reference outside air temperature KTam. The refrigerant circuit control portion 40b may switch from the non-pressurization refrigerant circuit to the pressurization refrigerant circuit in the air-heating operation mode when the temperature TAV of ventilation air (heating target fluid) heated by the interior condenser 12 (radiator) is equal to or lower than the target air temperature TAO.

(5) Although in the above-mentioned embodiments, the refrigeration cycle device 10 according to the present invention is applied to air conditioners 1 for electric vehicles by way of example, the application of the refrigeration cycle devices 10 is not limited thereto. For example, the refrigeration cycle device 10 may be applied to air conditioners for a normal vehicle that obtains a driving force for traveling from an internal combustion engine (engine), a hybrid vehicle that obtains a driving force for traveling from both an internal combustion engine and an electric motor for traveling. Further, the refrigeration cycle device 10 is not limited to those dedicated for vehicles, and may be applied to a stationary air conditioner, a cooling storage, a liquid heating-cooling equipment, and the like.

(6) The respective components included in the refrigeration cycle device 10 are not limited to those disclosed in the above-mentioned embodiments.

Specifically, as mentioned in the above-mentioned embodiments, an electric compressor is used as the compressor 11 by way of example. When being applied to the vehicle with the internal combustion engine, an engine-driven compressor may be used as the compressor 11. The engine-driven compressor is driven by a rotational driving force transferred from the engine for traveling via a pulley, a belt, and the like.

This kind of engine-driven compressor suitable for use can be a variable displacement compressor that is capable of adjusting the refrigerant discharge capacity by changing the displaced volume thereof, or a fixed displacement compressor that adjusts the refrigerant discharge capacity by changing an operating rate of the compressor through connection/disconnection of an electromagnetic clutch.

In the above-mentioned embodiments, the heating expansion valve 14 is disposed on the refrigerant outlet side of the interior condenser 12 by way of example. However, in place of the heating expansion valve 14, the refrigeration cycle may employ, as the decompression device, a heating fixed throttle, such as an orifice, a capillary tube, or a nozzle, and may further employ a fixed throttle bypass passage for guiding the refrigerant flowing out of the interior condenser 12 to the side of the exterior heat exchanger 15 while bypassing the heating fixed throttle, and an opening/closing device for opening and closing the fixed throttle bypass passage.

In this case, the opening/closing device may open the fixed throttle bypass passage at least in the air-cooling operation mode, while the opening/closing device may close the fixed throttle bypass passage in the air-heating operation mode and the strong-air-heating operation mode.

Although the above-mentioned embodiments employ the accumulator 19 by way of example, the accumulator 19 is not essential to obtain the effect of improving the heating capacity by the refrigeration cycle device 10 in the present invention. Thus, the accumulator 19 may be abolished. That is, the gas-liquid two-phase refrigerant or gas-phase refrigerant having a superheat degree may be drawn through the refrigerant suction port 21d of the ejector 21.

In the above-mentioned embodiment, the nozzle portion 21a and the body portion 21b of the ejector 21 are formed of metal by way of example. As long as the respective components can exhibit their own functions, materials for the components are not limited. Thus, these components may be formed of resin and the like.

The ejector 21 and the compressor 11 may be integrated with each other such that the refrigerant outlet of the diffuser 21f in the ejector 21 is directly coupled to the refrigerant suction port of the compressor 11. Alternatively or additionally, the ejector 21 and the accumulator 19 may be integrated with each other such that the refrigerant suction port 21d of the ejector 21 is directly coupled to the gas-phase refrigerant outflow port of the accumulator 19.

(7) Although in the above-mentioned embodiments, R134a or R1234yf can be employed as the refrigerant by way of example, the refrigerant is not limited thereto. For example, the refrigerants, such as R600a, R410A, R404A, R32, R1234yfxf, or R407C can be used. A mixed refrigerant including a mixture of a plurality of refrigerants among these kinds of refrigerants may be employed.

What is claimed is:

1. A refrigeration cycle device comprising:
   a compressor that compresses and discharges a refrigerant;
   a radiator that exchanges heat between a heating target fluid and a high-pressure refrigerant discharged from the compressor to dissipate heat from the high-pressure refrigerant;
   a decompression device that decompresses the refrigerant flowing out of the radiator;

an evaporator that exchanges heat between a heat-absorption target fluid and a low-pressure refrigerant decompressed by the decompression device to evaporate the low-pressure refrigerant;

an ejector that draws a refrigerant on a downstream side of the evaporator from a refrigerant suction port by a suction effect of an injection refrigerant injected at a high velocity from a nozzle portion decompressing the high-pressure refrigerant discharged from the compressor, wherein the ejector includes a pressurizing portion that mixes the injection refrigerant with the suction refrigerant drawn from the refrigerant suction port, pressurizes the mixed refrigerant, and allows the pressurized mixed refrigerant to flow out toward a suction port side of the compressor;

a flow-amount ratio adjustment portion that adjusts a flow amount ratio of an ejector-side refrigerant flow amount to a discharge refrigerant flow amount, wherein the discharge refrigerant flow amount is a flow amount of the refrigerant discharged from the compressor, and the ejector-side refrigerant flow amount is a flow amount of the refrigerant flowing into the nozzle portion of the ejector;

a flow-amount ratio control portion that controls an operation of the flow-amount ratio adjustment portion; and a controller configured to
  obtain a refrigerant discharge capacity of the compressor, and
  determine a target flow amount ratio, which is a target value of the flow amount ratio, based on the refrigerant discharge capacity of the compressor, wherein the flow-amount ratio control portion controls the operation of the flow-amount ratio adjustment portion such that an actual increase rate of a flow amount of the refrigerant actually flowing into the radiator is equal to or more than an increase rate of a radiator-side refrigerant flow amount that is a flow amount of the refrigerant flowing into the radiator when the flow-amount ratio is zero, the flow-amount ratio control portion is configured to control the flow-amount ratio adjustment portion such that the flow amount ratio approaches the target flow amount ratio, and the flow-amount ratio control portion is configured to control the operation of the flow-amount ratio adjustment portion to set the flow amount ratio to be greater than 0 and less than 0.7.

2. The refrigeration cycle device according to claim 1, further comprising a gas-liquid separator that separates the refrigerant flowing out of the evaporator into gas and liquid phase refrigerants, wherein
  a gas-phase refrigerant outflow port of the gas-liquid separator is coupled to the refrigerant suction port of the ejector.

3. The refrigeration cycle device according to claim 1, wherein
  the flow-amount ratio adjustment portion is configured of a flow-amount adjustment valve that adjusts the ejector-side refrigerant flow amount.

4. The refrigeration cycle device according to claim 1, wherein
  the flow-amount ratio control portion controls the operation of the flow-amount ratio adjustment portion such that the radiator-side refrigerant flow amount approaches a maximum value.

5. The refrigeration cycle device according to claim 1, further comprising a branch portion that branches the high-pressure refrigerant discharged from the compressor into a side of the radiator and an inlet side of the nozzle portion, wherein
  the branch portion is disposed such that the high-pressure refrigerant branched by the branch portion into the inlet side of the nozzle portion flows into the nozzle portion while bypassing the radiator.

6. The refrigeration cycle device according to claim 1, wherein
  the controller is configured to obtain a rotating speed of the compressor as the refrigerant discharge capacity.

\* \* \* \* \*